April 5, 1938.    K. A. BRAUNING    2,112,982
LOCK
Filed Jan. 17, 1933    5 Sheets-Sheet 1

Karl A. Brauning
INVENTOR
BY A. H. Golden
ATTORNEY

Karl A. Brauning
INVENTOR

A. H. Golden
ATTORNEY

Patented Apr. 5, 1938

2,112,982

UNITED STATES PATENT OFFICE 2,112,982

LOCK

Karl A. Brauning, Stamford, Conn., assignor to The Yale & Towne Mfg. Co., Stamford, Conn., a corporation of Connecticut Application January 17, 1933, Serial No. 652,140

47 Claims. (Cl. 70—81)

This invention relates to locker locks. More especially, it relates to a combination lock which is adapted to be applied to the door of the usual steel locker having a vertically sliding latching bolt mechanism. My combination lock is so designed also, that it may be applied quickly and easily to a locker having an automatically operated locking latch bolt, and will cooperate in every way with such a latch bolt.

As a feature of my invention I have devised a combination lock having a sliding locking bolt which may be cooperable with the usual sliding latching bolt of a locker for continuously controlling the same, preferably, while moving integrally with the same. This is a relatively important advance over the art in which the locker latching bolt is generally merely connected through pivotal means with a locking bolt, or in which the locking bolt is merely thrown in position to dog the locker latch bolt.

As a further feature of my invention I have devised a combination lock of the type indicated, and having mechanism for permitting the movement of the locking bolt to a release position, while remaining operable to automatically deadlock the same upon its return to locking position and to simultaneously disturb the combination so as to require a resetting of the same before further operation of the bolt is possible. While each of these features is itself of prime importance, in combination they are especially valuable in the design of a lock cooperable with the modern automatically operated locker latch bolt.

A further feature of the invention resides in the arrangement of a key operated mechanism for releasing the locking bolt without setting up the combination tumblers, this mechanism using as an operable part thereof a portion of the combination mechanism. A still further feature of the invention embodies means for resetting this portion of the combination mechanism and continuously controlling the same.

In the drawings.

Fig. 18 is a view of the key shaft which supports the tumblers, while Fig. 21 is a view of my positioning slide member while Fig. 23 is a view of my tumbler disperser while

Figs. 25 and 25a are a front view and a partial section of the dial plate while Figs. 30 and 30a illustrate plan and side views of a controlling washer while Figs. 34 and 34a are rear and side views of the locking plug utilized in the embodiment of Fig. 1. Fig. 35 illustrates a section of the dial assembly of Fig. 1 while

Figure 1:
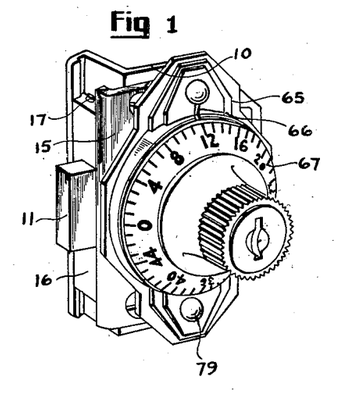
Figs. 1 and 2 are perspective views showing respectively, my locker lock equipped for master control by a key operated mechanism, and for operation only by the combination mechanism.
Figure 2:
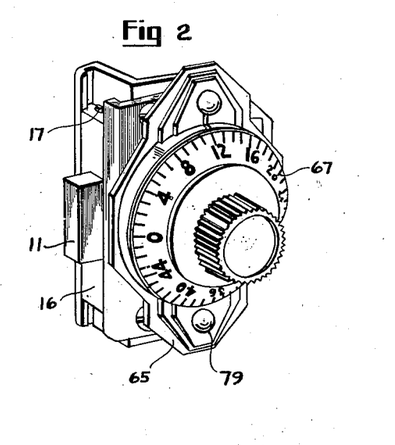
Figure 7:
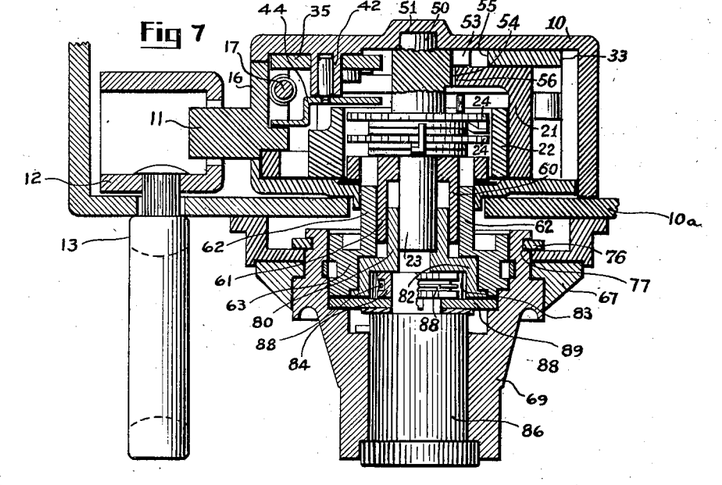
Fig. 7 is a section through a lock such as shown in Fig. 1 secured to a locker door and illustrating its cooperation with the handle mechanism for controlling the sliding locker door bolt.

Referring now more particularly to the drawings, and especially Figs. 1, 2 and 7, it will be readily seen that my invention embodies a locking structure comprising a casing 10 adapted to be secured to the door 10a of a usual locker structure and having a sliding outside locking bolt 11 mounted on one side of the casing for cooperation with a sliding locker latch bolt 12 which, in turn, is actuated by a handle 13. The locker door, the latch bolt and the handle construction are well known in the art and need not be described further. While per se they are not part of my invention, they form part of a combination I shall claim hereinafter. As will be readily understood, when the locking bolt 11 is in its central position illustrated in Figs. 1 and 8, the latch bolt 12 of the locker in its locking position, and if the locking bolt is deadlocked the locker latch bolt is also deadlocked. When the bolt 11 is released for movement to an upward position, and is moved to the position illustrated more particularly in Figs. 10, 11 and 15, the latch 12 to which bolt 11 is secured will be then positioned to permit opening of the locker.

It is desirable in an assembly of the type that I have just indicated, that the locking bolt 11 be automatically deadlocked upon its return to its locking position, which is its central position of Fig. 1, and which occurs when the locker bolt 12 is moved into locker door latching position. Simultaneously with this deadlocking of the bolt 11, there should be, preferably, a removal of the usual combination fence from the aligned tumbler gatings, and a dispersal of at least one tumbler from its aligned position. All these objects, accomplished by the operation of my simple mechanisms, will now be described.

Figure 3:
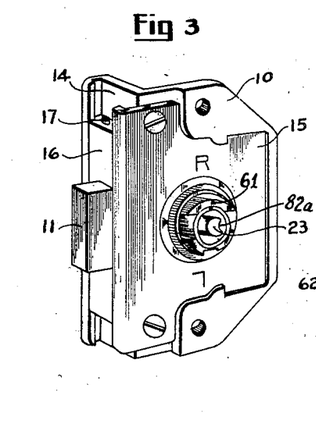
Fig. 3 is a perspective view of the lock of Fig. 1 or Fig. 2 with the dial mechanism and dial plate removed.
Figure 19:
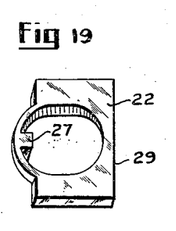
Fig. 19 is a view of the sliding fence and Fig. 20 is a view of the sliding bolt.
Figure 20:
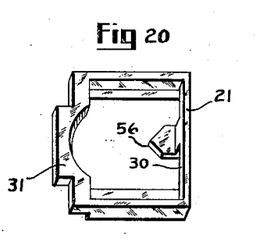
Figures 22, 22A:
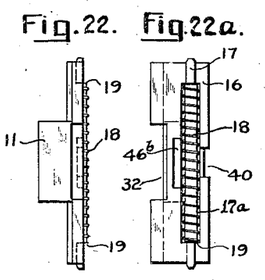
Figs. 22 and 22a are side and rear views of the sliding outside bolt.
Figure 23:
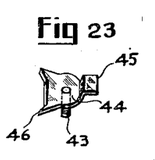

Referring now to Fig. 3, the casing 10 contains a bottom flanged plate 14 and an upper plate 15 which form, between their extended and bent over edges, a bearing for the sliding of the bolt 11 as will be readily seen. This bolt 11 is illustrated in detail in Fig. 22 and has a flat bearing portion 16 which is milled out at 17a for the mounting of a sliding balancing post member 17 which is maintained in its balancing position by a spring 18. The shoulders 19 of the member 17 and the spring 18, cooperate with the shoulders 20 of the casing 10 (shown in Fig. 9) to maintain the bolt 11 in the central balanced position illustrated in Figs. 1, 2 and 3. It is movable from this central position only when released by an inside deadlocking bolt 21 illustrated in Fig. 20 and controlled by the fence 22 illustrated in Fig. 19.

Figure 8:
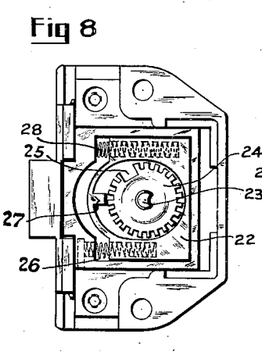
Figs. 8, 9, 10, 11 and 12 illustrate the operation of certain portions of the locking mechanism.
Figure 9:
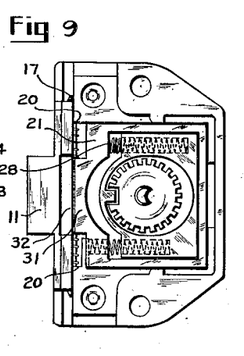
Figure 10:
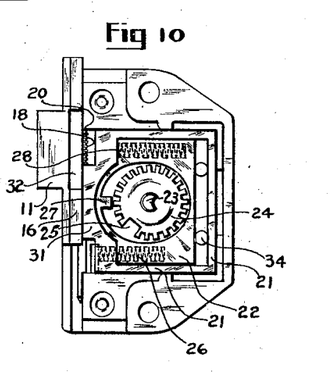

Referring now more particularly to Figs. 8, 9 and 10, it will be seen that a normally stationary shaft 23 carries a series of locking tumblers 24 having the usual gatings 25. The sliding fence 22 is spring pressed by the spring 26 so as to bring its lug portion 27 against the peripheries of the tumblers 24. As will be readily understood, when these tumblers 24 are rotated so that their gatings 25 become aligned as illustrated in Fig. 9, the fence 22 will move to the right from its position of Fig. 8 as the lug 27 thereof enters the gatings.

The inside deadlocking bolt 21 which surrounds the fence 22 is spring pressed outwardly relatively to the fence by a spring 28, the rear portion 29 of the fence limiting the outward movement of the deadlocking bolt 21 by cooperating with the inner rear surface 30 of the bolt as will be understood. When the tumbler gatings are aligned as illustrated in Fig. 9, the bolt and fence will be moved together into release position by spring 26, withdrawing the nose 31 of the deadlocking bolt from the cut-out portion 32 of the locking bolt 11, thus permitting the bolt 11 to be moved by locker latch bolt 12 to its upward position illustrated in Fig. 10, in which upper position the latch bolt 12 will be in locker releasing position.

As was indicated previously, it is desirable that this upward movement of the bolt 11 to release position, be accompanied by a movement of the fence out of the aligned gatings of the tumblers, and a dispersal of at least one of the tumblers, accompanied by a positioning of the deadlocking bolt 21 of the combination lock, so that return of the locking bolt 11 to its central balanced position, will cause the same to be deadlocked by the deadlocking bolt 21. I will now describe mechanisms for accomplishing these various purposes.

Figures 11, 12:
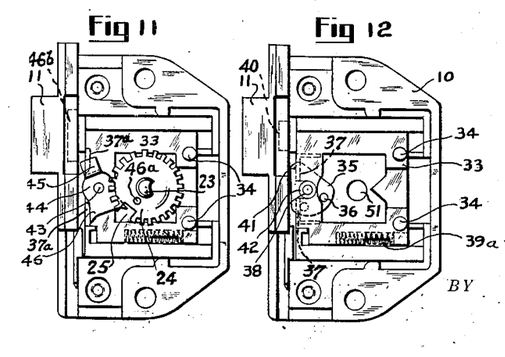
Figure 16:
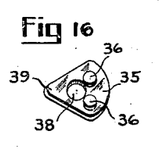
Fig. 16 is a view of a toggle for controlling the positioning slide and Fig. 17 is a detail view of the relation of the toggle to the key shaft which supports the tumblers, and the positioning slide.
Figure 17:
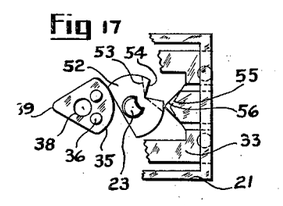
Figure 18:
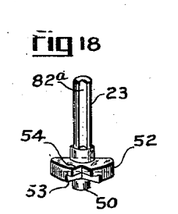
Figure 21:
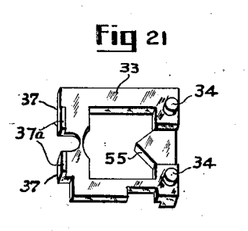

A positioning slide 33 is illustrated in Fig. 21, and has a pair of lugs 34 which cooperate with a downwardly extending portion of the rear surface 29 of the fence 22, so that when the positioning member 33 is moved to the left, it will move the fence 22 to the left (in any of the drawings) so as to withdraw the fence lug 27 from the aligned gatings 25 of the tumblers. For moving the sliding positioning member 33 to the left, I utilize a toggle member 35 which is shown in Fig. 16 and which operates as best illustrated in Fig. 12. This toggle member has a pair of pins 36 which cooperate with lugs 37 on the underside of the slide 33, so that as the toggle piece 35, which is pivoted at 38, on stud 42, is moved to its position illustrated in Fig. 12, one of the pins 36 will cooperate with a lug 37 for moving the sliding positioning piece 33 against the pressure of a spring 39a, which acts normally to maintain it at the extreme right of the position illustrated in Fig. 12. The toggle piece 35 is movable into its position illustrated in Fig. 12 by the cooperation of its end portion 39 with a cut-out portion 40 of the plate portion 16 of the bolt 11. The member 33 has upper lugs 37a shown in Fig. 21 and in Fig. 11, which cooperate with a tumbler disperser to be described later. For convenience, lugs 37a are not shown in Fig. 12.

It is thus seen that by the upward movement of the locking bolt 11 from its position in Fig. 9 to its position in Figs. 10 and 12, it operates the point 39 of toggle 35 to cause pins 36 to move the sliding piece 33 to the left and thus withdraw the lug 27 of the fence member 22 from its position in the aligned gatings of the tumblers.

The stud 42 on which the toggle 35 is mounted at point 38, is bored out to accommodate a pin 43 of a disperser member 44 so that the disperser member 44 may operate in the manner best illustrated in Fig. 11. It will be seen that the disperser 44 is equipped with a tail piece 45 which is cooperable with a cut-out upper portion 46b of the bolt surface 16 so that movement of the locking bolt from its position in Fig. 9 to its position of Figs. 10 and 11 will cause the disperser 44 to move to the position of Fig. 11, during which movement one of its flipper ends 46 contacts a pin 46a on one of the tumblers 24 so as to move the same into a position wherein its gating 25 will no longer be opposite the lug 27 of the fence 22.

From the mechanism I have so far described, it is quite apparent that release of the outer or locking bolt 11 for upward movement with locker latch bolt 12 is possible upon alignment of the gatings 25 of tumblers 24, causing a release movement of inner or deadlocking bolt 21. Upward movement of the locking bolt 11 when so released will cause removal of the fence lug 27 from the aligned gatings 25 and simultaneous dispersion of at least one of the tumblers from its set position. It will also be quite apparent that with the parts then in the position of Fig. 10, the nose 31 of the bolt 21 will abut the face 16 of the bolt 11, thus compressing the spring 28 to a considerable extent and putting the deadlocking bolt 21 under extreme tension. Therefore, when the locking bolt 11 is moved downwardly into its position of Fig. 8, the nose 31 of the deadlocking bolt will immediately press into the cutout portion 32 and maintain the bolt 11 securely in its position illustrated in Fig. 8 until the operations already described have been repeated. Actually, the locker latch bolt 12 with which locking bolt 11 cooperates, is of the type maintained in an upper releasing position until the locker door is closed, whereupon it drops into a locking position.

The shaft 23 on which the tumblers 24 are mounted, is rotatably mounted in the casing by cooperation of its stud 50 with the opening 51 in the bottom plate of the casing. The shaft 23 is equipped with a rather peculiar shaped portion 52 having lower and upper V-notches 53 and 54 which cooperate respectively with the V-shaped elements 55 and 56 of the sliding positioning member and bolt 21 respectively. As will be indicated later, the shaft 23 may be rotated by key controlled mechanism so that the V-shaped groove 54 will abut the V-shaped member 56 of the bolt 21, thus retracting the deadlocking bolt 21 as effectively as though the combination had been set up as previously described.

The key controlled means for operating the shaft 23 do not per se form a part of this invention, being shown and claimed in my application, Serial No. 578,920 filed December 4, 1931, but will be described herein later. The means for controlling the shaft 23 for always maintaining it in properly aligned position, do form a part of this invention and will be described below.

It will be readily understood that shaft 23 must be maintained in a particular definite relationship to the casing and the tumblers, or otherwise, the tumblers cannot be properly set up to a definite combination. For the purpose of maintaining the shaft 23 as indicated, the V-grooves 53 and 54 are utilized. During ordinary operation of the lock and when the deadlocking bolt 21 is in locking position, it will be observed that the member 56 must necessarily be in its extreme left position and thus in cooperation with the upper V-groove 54, thus maintaining the shaft 23 in correct aligned position. When the bolt 21 is drawn to the right to release the outside locking bolt 11, the V member 56 is immediately withdrawn from the groove 54. However, in this position, the tumblers are maintained against movement by entrance of the lug 27 of the fence member 22 in their aligned gatings 25, and control is had over them. As will be remembered, upward movement of the bolt 11, subsequent to the aligning of the tumblers 24 and the movement of the fence and bolt to the right as illustrated in Fig. 9, causes movement of the lug 27 out of the aligned tumblers. It will be remembered that this movement to the left of the fence 22 to withdraw the lug 27 from the aligned gatings, is accomplished by movement to the left of the positioning member 33. This causes the V member 55 to enter the lower groove 53 as will be readily understood, so as to maintain the alignment of the shaft 23.

Figure 14:
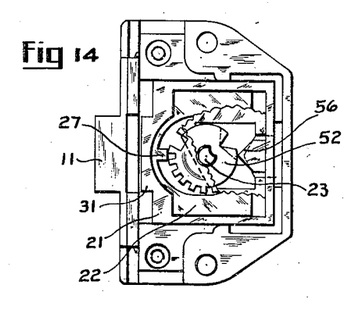
Figs. 14 and 15 illustrate the operation of a positioning slide.
Figure 15:
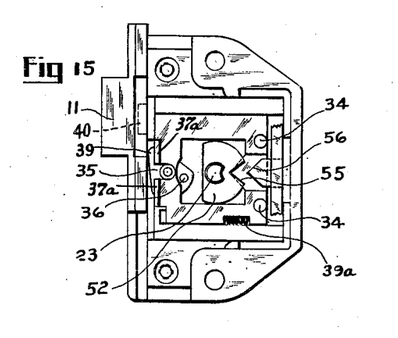

It is therefore apparent that in the locked position of the mechanism, the V member 56 controls the position of the shaft 23; and that the shaft is relatively free but the tumblers are maintained in proper position when the fence 22 is moved to the right to release the bolt 11. It will be further understood that when both the lug member 27 of fence 22, and the V member 56 of the bolt 21 are ineffectual to control the shaft 23, then the V portion 55 of the sliding positioning member 33 becomes effective to do the work. Fig. 14 illustrates the position of the parts just as the deadlocking bolt 21 is about to shoot forward into locking position, at which time member 56 will become effective to position the shaft 23 properly. Fig. 15 illustrates the positioning of the shaft 23 by the V member 55 of the slide 33, this movement of the slide 33 being caused by the toggle member 35 as has previously been indicated.

Figure 4:
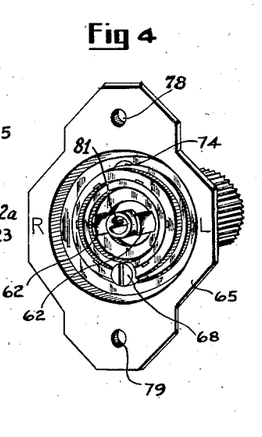
Figs. 4 and 5 are respectively perspective views of the under side of the dial mechanism of the locks shown in Figs. 1 and 2.
Figure 5:
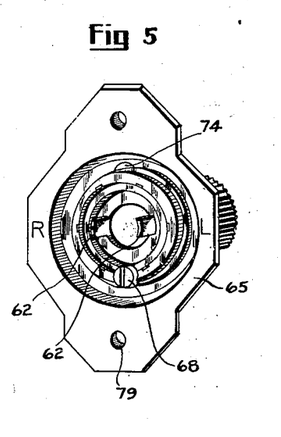
Figure 6:
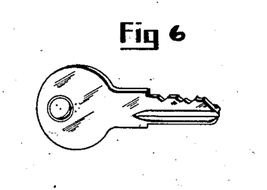
Fig. 6 is a view of a key used for operating the lock of Fig. 1.
Figure 24:
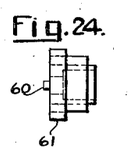
Figs. 24 and 24a are side and front views of the tumbler actuator.
Figure 24A:
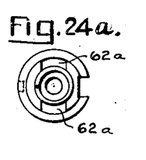

The normally stationary shaft 23 has the usual series of tumblers 24 mounted thereon, which tumblers are actuated by the lug 60 of the member 61 shown in Fig. 24, and which is itself mounted on the shaft as best illustrated in Figs. 3 and 7, for actuation by a pair of lugs 62 carried by the dial assembly as shown in Figs. 4 and 5. These lugs are an integral part of a member 63 shown in Fig. 27 which member is best shown in relation to the dial mechanism in Figs. 35 and 38.

I shall now describe the construction of my dial mechanism whereby the shaft 23 may be operated by rotation of the dial mechanism to release the locking mechanism without the setting up of the tumblers. This part of my apparatus per se in so far as it includes the key operated clutch mechanism described below, forms no part of the present invention but is described and claimed in the pending application already indicated. Before describing the apparatus, I shall indicate the mechanism assembled to form the dial, and the method by which the combination may be changed.

Figure 25:
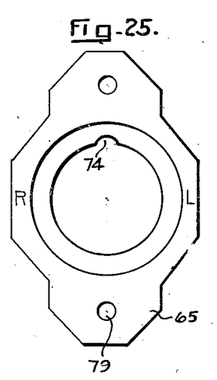
Figure 25A:
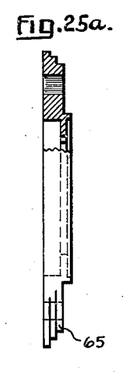
Figure 26:
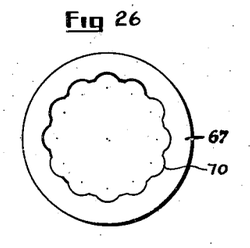
Figs. 26 and 26a are a rear view and partial section of the numbered dial itself.
Figure 26A:
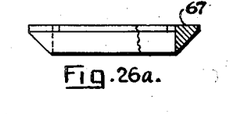
Figure 28:
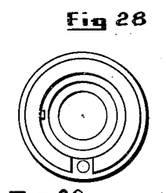
Figs. 28 and 28a are bottom and side views of the body of the dial carrying portion of Fig. 1.
Figure 28A:
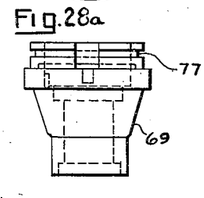
Figure 29:
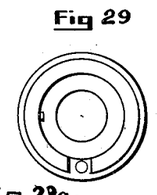
Figs. 29 and 29a show similar views of the body of the dial where no key controlled mechanism is utilized as in Fig. 2.
Figure 29A:
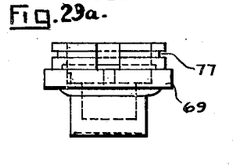

A dial plate 65 shown in Fig. 25 and Figs. 1 and 2 carries an indicator point 66 relatively to which the dial 67, shown in Fig. 26, is mounted for movement to set up the combination in the usual manner. This dial 67 is maintained by a rotary stud 68 for fixed rotation with the main body 69 of the dial which is shown in Figs. 28, 28a, 29 and 29a. The dial body of Figs. 28 and 28a is intended for use with a key operating mechanism such as shown in Fig. 35, while the dial body of Figs. 29 and 29a is intended for use with a dial not equipped with a key operating mechanism as shown in Fig. 38.

Figure 38:
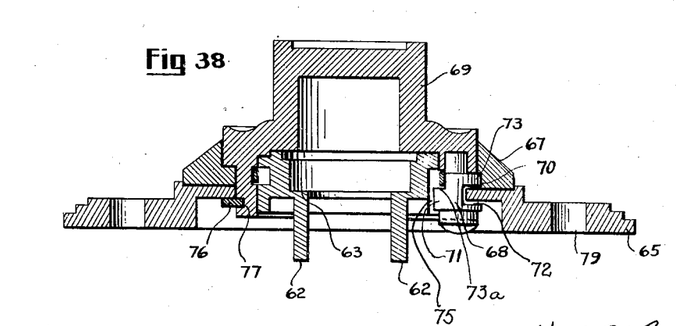
Fig. 38 illustrates the dial assembly of Fig. 2.

As shown in Fig. 26, the inner periphery of the figured dial 67 is equipped with a series of indentations 70 into which the body portion 73 of the stud 68 normally engages as best indicated in Fig. 38. It will be seen that the stud also contains a cutaway portion 73a which displaces the body portion 73 when the screw is rotated from the position of Fig. 38 to the position in Fig. 35. It will be readily seen that rotation of the numbered dial 67 is then possible relatively to the body member 69 to set the combination at any desired point. It will also be seen that because of the configuration of the stud member 68 which has a lower lug portion 71, it will be impossible to rotate that screw into a position to release the dial 67 relatively to the body member 69 until the screw is placed opposite the cut-away portion 74 of the dial plate 65 as illustrated in Figs. 25 and 35. Thus, in order to reset the combination at any time, it is first necessary to rotate the body 69 and dial member 67 relatively to the dial plate 65 until the point 74 has been reached by the part 71 of stud 68, whereupon rotation of the screw is possible to release the dial and permit resetting of the combination.

Figure 27:
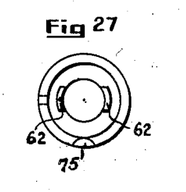
Figs. 27 and 27a illustrate parts of the dial carried tumbler actuating mechanism.
Figure 27A:
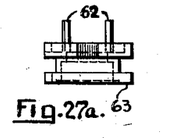
Figure 35:
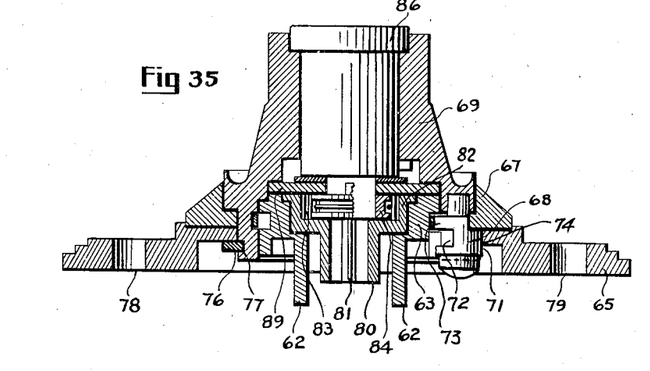

It will also be understood that the portion 71 of the stud 68, when not in its release position of Fig. 35, will normally ride into a cut-away portion 75 of the member 63 illustrated in Fig. 27, for retaining that member in fixed relation to the dial body for operating the tumblers as has already been described.

Figure 13:
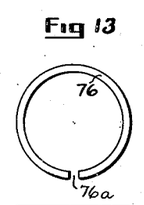
Figs. 13 and 13a are respectively side and plan views of a spring washer utilized to hold the dial mechanism assembled on the dial plate.
Figure 13A:
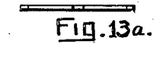

The spring member 76 showed in detail in Figs. 13 and 13a cooperates with a groove 77 in the dial body for maintaining that body in position relatively to the dial plate 65. The open part 76a will accommodate the stud 68 which functions to maintain the member 76 in proper position. The dial plate is itself bored out at points 78 and 79 whereby it may be secured to the locker door in a manner understood by those skilled in the art.

Figure 30:
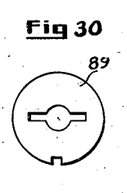
Figure 30A:
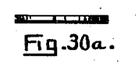
Figure 31:
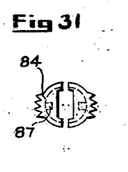
Figs. 31 and 31a show similar views of clutch mechanism utilized in the dial.
Figure 31A:
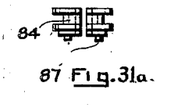
Figures 32, 32A, 33, 33A:
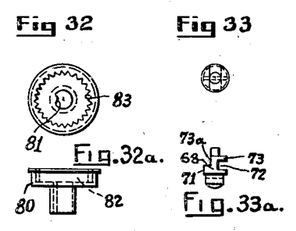
Figs. 32 and 32a illustrate a clutch part with which the clutch mechanism of Fig. 31 cooperates.
Figs. 33 and 33a show a screw used for changing the dial combination.
Figure 34:
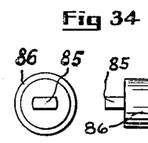
Figure 36:
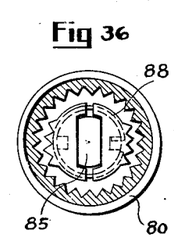
Figs. 36 and 37 show the operation of the clutch mechanism embodying the parts of Figs. 31 and 32.
Figure 37:
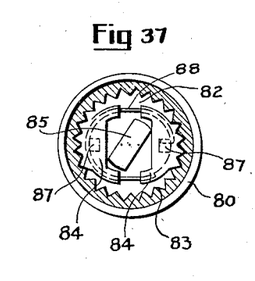

I shall now describe the mechanism for operating shaft 23 and thus releasing the locking mechanism without setting up the combination. Maintained within and in nested relation to the member 63, is a clutch member 80 having a longitudinal rib or lug 81 which cooperates with a hollow milled portion 82a of the shaft 23 for retaining the part 81 against movement relatively to the shaft 23 during normal rotation of the dial 67 with its body 69 on the dial plate 65 during the setting of the tumblers. As best illustrated in Figs. 36 and 37, the inner wall of the chamber 82 of the member 80 has a series of teeth 83 with which are adapted to cooperate a pair of sliding clutch members 84 (Figs. 31 and 31a) normally maintained by spring 88 against the cam 85 of the plug 86 mounted in the usual manner in the body 69 of the dial. These clutch members 84 are equipped with lugs 87 whereby they are slidably mounted on the plate 89 shown best in Figs. 30 and 31a, and during normal operation of the dial are maintained by the spring 88 against the plug cam so as to rotate with the dial body 69 and the plug 86 and entirely out of contact with the clutch teeth 83 of the clutch member 80.

However, when the lock 86 is operated in a conventional manner so as to rotate the cam 85 from its position of Fig. 36 to the position of Fig. 37, it will be readily seen that there will be a clutching engagement between the teeth of the sliding clutch members 84 and the teeth 83 of the rotating clutch member 80, so as to firmly secure the member 80 for rotation with the dial body. Such rotation directly with the dial body will naturally cause the lug or rib 81 of the clutch member 80 to rotate the tumbler shaft 23 and thus cause the V cam 54, by its cooperation with the lug 56 of the deadlocking bolt 21, to withdraw that bolt from locking position in the usual manner. It will also be understood that movement of the vertically sliding bolt 11 to its upward position will then operate the toggle member 35, which through its pins 36 will move the positioning slide 33 to the left as shown in Fig. 15 so as to cooperate with the groove 53 of the shaft carried member 52 and restore the shaft 23 to its initial and normal position, which position it will then occupy after the bolt has been placed in locked position to permit normal tumbler operation.

While I believe that I have clearly indicated the salient features of my invention, it probably will be helpful to present now a summary of the operation thereof. My lock contains a key operated shaft 23 which is normally maintained against rotary movement relatively to the lock mechanism by a portion 56 of the deadlocking bolt 21. This permits proper setting of a series of tumblers 24 by a dial body 69 carrying an indicating dial 67 set relatively to a dial plate 65. This setting of the tumblers takes place through a member 63 having portions 62 projecting into cut-out portions 62a of a member 61 which has a lug 60 for operating the tumblers in the usual manner well known in the art. Upon the alignment of the gatings of the tumblers, the fence member 22 will move to the right permitting its lug member 27 to enter the aligned gatings so as to maintain the tumblers in a set position, while the deadlocking bolt 21 will also move to the right to release vertical bolt 11 while withdrawing the member 56 from controlling position relatively to the shaft 23.

The bolt 11 may then move to an upward position which upward position allows for simultaneous upward movement of the locker latch bolt 12 (Fig. 7). The upward movement of the bolt 11 is accompanied by a movement to the left of the positioning member 33 caused by the toggle 35 which is operated by a portion of the bolt 11 in its upward movement. This movement of the member 33 moves the fence 22 to the left and removes the lug 27 from the aligned gatings, and simultaneously positions the shaft 23 by cooperation of the V member 55 of the slide 33 with the lower V notch 53 of the shaft 23.

The upward movement of the bolt 11 acts also to move the disperser member 44 to disperse one of the tumblers, thus leaving the fence 22 in the extreme left position with the bolt 21 under tension of the spring 28 and in the position shown in Fig. 10. It is quite obvious that when the bolt 11 moves into its central position the bolt head 31 of the deadlocking bolt 21 will then spring forward into locking relation with the bolt 11 and will prevent any further movement thereof.

The numbered dial 67 is maintained in a fixed relation to the dial body 69 by a particular stud 68 whose rotation when the dial body is positioned in a certain relation to a notch 74 of the dial plate 65, permits release of the numbered dial 67 relatively to the body 69 so as to permit resetting of the combination.

My lock is also operable by rotation of the key shaft 23 which causes the V notch 54 to cooperate with the member 56 of deadlocking bolt 21 to remove that bolt from locking relation to the outside sliding bolt 11. In order to accomplish this operation, a locking plug 86 carried by the dial body 69 is rotated so as to position the plug cam 85 to move clutch members 84 into cooperation with teeth 83 of the normally loosely mounted member 80. This causes a binding relation between the dial body 69, the clutch member 80 and the shaft 23 whereby the shaft may be rotated as has been described.

I claim:

1. In a combination lock, a series of tumblers having gatings adapted to be aligned, a fence spring pressed against said tumblers, a bolt associated with said fence and spring pressed in a locking direction relatively thereto, and means connecting said bolt to said fence for movement to an unlocking position as said fence is moved into the tumbler gatings.

2. In a combination lock, a series of tumblers, a fence spring pressed against said tumblers, a bolt associated with said fence and spring pressed into an outside locking position relatively thereto, and means connecting said fence and bolt for combined movement to an unlocking position under the influence of said fence while permitting said bolt to occupy said unlocking position when said fence is moved back to locking position.

3. In a combination lock, a series of tumblers, a fence spring pressed against said tumblers, a bolt associated with said fence and spring pressed into locking position relatively thereto, and means connecting said fence and bolt for combined movement to an unlocking position under the influence of said fence and its spring pressure, while permitting said bolt to occupy said unlocking position when said fence is moved back to locking position.

4. In a combination lock, a series of tumblers having gatings, a fence, a deadlocking bolt, a locking bolt controlled by said deadlocking bolt, means of control between said deadlocking bolt and fence whereby said bolt and fence may be moved to release position upon proper alignment of the tumbler gatings, said means of control being so constructed that said deadlocking bolt may remain in release position while said fence is moved into locked position outwardly from said tumbler gatings and means for moving said fence outwardly from said gatings while said bolt remains in release position.

5. In a combination lock, a series of tumblers having gatings, a fence, a bolt, means connecting said bolt and fence whereby said bolt and fence may be moved to release position upon proper alignment of the tumbler gatings, said connecting means being so arranged that said bolt may remain in release position while said fence is moved into locked position outwardly from said tumbler gatings, means whereby said bolt is held against movement to a locking position, and means for moving said fence outwardly from said gatings while said bolt remains in release position.

6. In a combination lock, a series of tumblers having gatings, a fence, a deadlocking bolt, a locking bolt controlled by said deadlocking bolt, means of control between said deadlocking bolt whereby said deadlocking bolt and fence may be moved to release position upon proper alignment of the tumbler gatings and the movement of said fence into said gatings, said means of control being so constructed that said deadlocking bolt may remain in release position while said fence is moved into locked position outwardly from said tumbler gatings, and means operable by movement of said locking bolt for moving said fence out of said gatings.

7. In a combination lock, a series of tumblers having gatings, a fence, a bolt, a member controlled by said bolt, means connecting said bolt and fence whereby said bolt and fence are pressed into release position upon proper alignment of the tumbler gatings, said connecting means being so arranged that said bolt may remain in release position while said fence is moved into locking position outwardly from said tumbler gatings, means whereby said bolt is held against movement to a locking position, and means operable by movement of said member when it is released by said bolt adapted to move said fence out of the gatings.

8. In a combination lock, a series of tumblers having gatings, a fence cooperable with said gatings, a bolt, a member adapted to be locked by said bolt and to be released for movement by retraction of said bolt, means connecting said bolt and fence whereby said bolt is retracted with said fence into position to release said member upon proper alignment of the tumbler gatings, said connecting means being so arranged that said bolt may remain in release position while said fence is moved back into locking position outwardly from said tumbler gatings, means whereby said bolt is held against movement to a locked position and is put under tension when said fence is moved back into locked position, and means operable by said member for moving said fence out of said gatings and for placing said bolt under tension when said member moves into release position upon being released by said bolt.

9. In a lock, a series of rotatable tumblers having gatings, a fence adapted to enter said gatings when aligned, a deadlocking bolt movable by said fence into release position, said deadlocking bolt being spring pressed away from said fence and urged into position to lock a locking bolt when said fence is outside the tumbler gatings, and said locking bolt having an opening into which said deadlocking bolt is adapted to enter to lock said locking bolt against movement.

10. In a lock, a series of rotatable tumblers having gatings, a fence adapted to enter said gatings when they are aligned, a means adapted to be released for independent sliding movement to a release position when said fence enters the gatings, and means adapted to be actuated upon the said release movement of said first means for throwing said fence out of the aligned tumbler gatings.

11. In a lock, a series of rotatable tumblers having gatings, a fence adapted to enter said gatings when they are aligned, a means adapted to be released for sliding movement when said fence enters the gatings, a second means adapted to be moved by said first means when it is moved after release by said fence movement, said second means being operable to remove the fence from said gatings, and to rotate at least one of said tumblers out of gating aligned position.

12. In a lock, a series of rotatable tumblers having gatings, a fence adapted to enter said gatings when they are aligned, a means adapted to be released for sliding movement when said fence enters the gatings, a pair of levers adapted to be moved by said means member when it is moved after release by said fence movement, one of said levers being operable to remove the fence from said gatings, the other of said levers being operable to rotate at least one of said tumblers out of gating aligned position.

13. In a lock, a casing, a locking bolt, a deadlocking bolt spring pressed into a locking portion of said locking bolt, means for moving said deadlocking bolt out of said locking portion to permit sliding of said locking bolt to a release position, and means for placing said dead-locking bolt under spring pressure to move into the locking bolt locking portion when the locking bolt moves back into its locked position, said last mentioned means being operable by the movement of the locking bolt into release position.

14. In a lock, a casing, a locking bolt slidable vertically on one edge of said casing, a deadlocking bolt spring pressed into a locking portion of said locking bolt, means for moving said deadlocking bolt out of said locking portion to permit sliding of said locking bolt to a release position, and means for placing said deadlocking bolt under spring pressure to move into the locking bolt locking portion when the locking bolt moves back into its locked position, said means for operating the deadlocking bolt being actuated by movement of said locking bolt to release position.

15. In a lock, a casing, a member controllable by locking means in said casing and adapted for predetermined movement when released, said locking means comprising a bolt spring pressed into a locking portion of said member, means for moving said bolt out of said locking portion to permit said predetermined movement of the said member, means whereby said bolt is thereafter releasably maintained against movement back into said locking portion, and means for placing said bolt under spring pressure to move into the locking portion of the member when the member moves back into its initial locked position, said means for so placing the inside bolt under tension being actuated by said predetermined movement of said member.

16. In a combination lock, a series of tumblers having the usual gatings, a fence, a deadlocking bolt, a positioning member, a vertically sliding locking bolt controlled by said deadlocking bolt, said fence and deadlocking bolt being movable into release position upon alignment of said tumbler gatings, means connecting said positioning member to said locking bolt member and also to said fence member, whereby movement of said locking bolt into a release position after it has been released by said deadlocking bolt will operate said positioning means to remove the fence from the tumbler gatings, and means operable simultaneously to disperse at least one of said tumblers.

17. In a combination lock, a series of tumblers having the usual gatings, a fence, a deadlocking bolt, a positioning member, a vertically sliding locking bolt controlled by said deadlocking bolt, said fence and deadlocking bolt being movable into release position upon alignment of said tumbler gatings, means connecting said positioning member to said locking bolt and also to said fence, whereby movement of said locking bolt into a release position after it has been released by said deadlocking bolt, will operate said positioning member to remove the fence from the tumbler gatings, and means of connection between said fence and deadlocking bolt adapted to place the deadlocking bolt under tension until allowed to lock said locking bolt upon the same being moved back into locking position.

18. In a combination lock, a series of tumblers, a sliding fence, a sliding deadlocking bolt, a sliding positioning member, and a vertically sliding locking bolt controlled by said deadlocking bolt member, means connecting said deadlocking bolt and fence whereby said deadlocking bolt may be moved to release position upon proper alignment of the tumbler gatings, said connection permitting said deadlocking bolt to remain in release position while said fence is moved outwardly from the tumbler gatings, means connecting said sliding positioning member to said locking bolt, and also to said fence, whereby movement of said locking bolt into release position will operate said positioning member to remove the fence from the tumbler gatings, and means operable simultaneously to disperse at least one of said tumblers from release position.

19. In a combination lock, a series of tumblers having gatings, a fence spring pressed in a direction whereby to move towards said tumblers and into the aligned gatings thereof, a bolt movable positively by said spring pressed fence when said fence moves into the aligned gatings, means whereby said bolt is spring pressed relatively to said fence in a locking direction, said bolt being movable in an unlocking direction relatively to said fence and against said spring pressure whereby to be released from locking position without releasing movement of said fence, and means for so moving said bolt.

20. In a combination lock, a series of tumblers having gatings, a fence spring pressed whereby to move towards said tumblers and into the aligned gatings thereof, a bolt movable positively by said fence when said fence moves into the aligned gatings, means whereby said bolt is spring pressed relatively to said fence in a locking direction, said bolt being movable in an unlocking direction relatively to said fence and against said spring pressure whereby to occupy a spring pressed release position, while said fence is in locking position, and key controlled mechanism for so moving said bolt.

21. In a combination lock, a key operated shaft, a series of tumblers having gatings, a fence adapted to move against said tumblers and into the aligned gatings thereof, a bolt movable with said fence when said fence moves into the aligned gatings, means whereby said bolt is spring pressed relatively to said fence in a locking direction, said bolt being movable in an unlocking direction relatively to said fence and against said spring pressure whereby to be released from locking position without releasing movement of said fence, and means movable by the key operation of said shaft for so moving said bolt.

22. In a combination lock, a key operated shaft, a series of tumblers having gatings mounted for rotation on said shaft, a fence spring pressed whereby to move toward said tumblers and into the aligned gatings thereof, a bolt movable positively by said fence when said fence moves into the aligned gatings, means whereby said bolt is spring pressed relatively to said fence in a locking direction, said bolt being movable in an unlocking direction relatively to said fence and against said spring pressure whereby to occupy a spring pressed release position while said fence is in a locking position, and means operated by key rotation of said tumbler supporting shaft for so moving said bolt.

23. In a combination lock having a key operated shaft, a series of tumblers mounted for rotation on said shaft, a bolt, a fence, means for rotating said tumblers on said shaft to permit movement of said fence and bolt to a release position, said key operated shaft being rotatable independently of said tumbler operation to move said bolt to a release position, means normally maintained locked by said bolt, and means for positively positioning said shaft in its initial position upon releasing movement of said normally locked means, whereby to reset said shaft and tumblers.

24. In a lock, a series of rotatable tumblers having gatings, a fence adapted to enter said gatings when aligned, a bolt movable with said fence into a release position and out of locking engagement with a member, means for moving said fence out of said gatings, and spring means between said fence and bolt adapted to be placed under tension when said fence is moved out of the gatings, said spring means being adapted thereafter to urge said bolt into locking engagement with said member.

25. In a lock, a series of rotatable tumblers having gatings, a fence adapted to enter said gatings when aligned, a locking bolt movable with said fence into a release position and out of locking position, means for moving said fence out of said gatings, and spring means between said fence and bolt whereby when said fence is moved out of the gatings it yieldingly urges said bolt into a locking position.

26. In a lock, a series of rotatable tumblers having gatings, a fence adapted to enter said gatings when aligned, a bolt adapted for release movement under the control of said fence, means for moving said fence out of said aligned gatings, and spring means for urging said bolt back to locking position adapted to be placed under tension by said fence when moving out of the aligned gatings.

27. In a lock, a series of rotatable tumblers having gatings, a fence adapted to enter said gatings when aligned, a bolt movable positively by said fence as it enters the gatings, and spring means adapted to be placed under tension by said fence as it moves out of the gatings for urging said bolt back into locking position.

28. In a lock, a series of rotatable tumblers having gatings, a fence adapted to enter said gatings when aligned, a locking bolt movable with said fence into a release position and out of locking engagement with a lock controlled member, means for moving said fence out of said gatings, and spring means between said fence and bolt adapted to be placed under tension when said fence is moved out of the gatings while said bolt is prevented from moving into locking engagement with said member, means whereby said bolt is maintained against movement into locking engagement with said member, said spring means being adapted thereafter to urge said locking bolt into locking engagement with said member.

29. In a lock, a series of rotatable tumblers having gatings, a fence adapted to enter said gating when aligned, a locking bolt movable with said fence into a release position and out of locking engagement with a lock controlled member, means for moving said fence out of said gatings and simultaneously rotating one of said tumblers, and spring means between said fence and bolt adapted to be placed under tension when said fence is moved out of the gatings while said bolt is prevented from moving into locking engagement with said member, means whereby said bolt is maintained against movement into locking engagement with said member, said spring means being adapted thereafter to urge said locking bolt into locking engagement with said member.

30. In a lock, a series of rotatable tumblers having gatings, a fence adapted to enter said gatings when aligned, a bolt adapted for release movement under the control of said fence, means for moving said fence out of said aligned gatings and simultaneously rotating one of said tumblers, and spring means for urging said bolt back to locking position tensioned by said fence when it moves out of the aligned gatings.

31. In a lock, a casing, a bearing formed on one side of said casing, a bolt slidable on said bearing, a spring maintained in fixed relation to said casing and tending to maintain said bolt in a predetermined original position, said bolt being movable in opposite directions from the original position and relatively to said casing, and means whereby said spring is tensioned regardless of the directional movement of said bolt so as to tend to return said bolt to its original position.

32. In a lock, a lock controlled member, a bolt spring pressed into locking engagement with said member, means for moving said bolt out of said locking engagement to permit movement of said member from its original position to a predetermined position, means for placing said bolt under spring pressure to move into locking engagement with said member when said member moves back to its original position, said last mentioned means being operable by the movement of the member from its original position to said predetermined position.

33. In a lock, a lock controlled member, a bolt spring pressed into a locking portion of said member, means for moving said bolt out of said locking portion to permit movement of said member from its original position to a predetermined position, means for placing said bolt under spring pressure to move into the locking portion of said member when said member moves back to its original position, said last mentioned means being operable by movement of the member from its original position to said predetermined position.

34. In a lock, a lock controlled member, a bolt spring pressed into locking engagement with said member, a series of combination tumblers having gatings adapted to be aligned, said bolt being movable out of locking engagement with said member when said gatings are aligned whereby to permit movement of said member from its original position to a predetermined position, means for placing said bolt under spring pressure to move into locking engagement with said member when said member moves back to its original position, means for moving one of the said combination tumblers out of gating aligned position, said tumbler moving means and said means for placing the bolt under spring pressure being operable by the movement of the member from its original position to said predetermined position.

35. In a combination lock, a series of tumblers having the usual gatings, a fence, a bolt, a lock controlled member adapted to be locked by said bolt, said fence and bolt being movable into release position upon alignment of said tumbler gatings, means connecting said fence for operation by said lock controlled member whereby movement of said lock controlled member into a release position after it has been released by said bolt will operate to remove the fence from the tumbler gatings, and means of connection between said fence and bolt whereby to place said bolt under tension when the fence leaves the gatings, until said bolt locks said member upon the movement of said member back into locking position.

36. In a combination lock, a series of tumblers having the usual gatings, a fence, a bolt, a lock controlled member adapted to be locked by said bolt, said fence and bolt being movable into release position upon alignment of said tumbler gatings, means connecting said fence for operation by said lock controlled member whereby movement of said lock controlled member into a release position after it has been released by said bolt will operate to remove the fence from the tumbler gatings, means of connection between said fence and bolt whereby to place said bolt under tension when the fence leaves the gatings, until said bolt locks said member upon the movement of said member back into locking position, and means operable also to move one of said tumblers out of gating aligned position when said fence is removed from the tumbler gatings.

37. In a lock for a locker of the type having a vertically moving latch bolt which is adapted to be moved vertically into a release position and then to drop automatically back to latching position when the door is closed, a lock associated with said latch bolt for locking it in latching position, said lock having a vertically moving member, means whereby said member moves integrally with said locker latch bolt, and means in said lock for deadlocking said vertically moving member, and through it the locker latch bolt.

38. In a lock for a locker of the type having a vertically moving latch bolt which is adapted to be moved vertically into a release position and then to drop automatically back to latching position when the door is closed, a lock associated with said latch bolt for locking it in latching position, said lock having a vertically moving member, means whereby said member moves integrally with said locker latch bolt, a combination controlled locking mechanism for locking said vertically moving member and through it the locking latch bolt, and for releasing the vertically moving member and said latch bolt when the combination is properly set up, whereby to permit vertical movement of said latch bolt to releasing position, and means operated by said vertically moving member in its vertical movement with said latch bolt for dispersing the set up combination.

39. In a lock, a lock controlled member, a bolt spring pressed into locking engagement with said member, means for moving said bolt out of said locking engagement to permit movement of said member from its original position to a predetermined position, means for placing said bolt under spring pressure to move into locking engagement with said member when said member moves back to its original position, the body of said lock controlled member preventing movement of said bolt under said spring pressure, said last mentioned means being operable by the movement of the member from its original position to said predetermined position.

40. In a lock for a locker of the class described, a locker latch bolt, a lock casing on said locker, a vertically movable locking bolt mounted accessibly on the outside of said casing, a tumbler controlled locking bolt within said casing adapted to deadlock said locking bolt against movement, and means of connection between said locker latch bolt and said vertically movable locking bolt.

41. In a locker lock, a sliding latch bolt, a sliding retracting means therefor, a casing, a vertically moving locking bolt projecting from the inside of the casing movable on the outside of said casing, and a tumbler controlled dead locking bolt within said casing adapted to lock said locking bolt against movement, and means whereby said locking bolt and said locker latch bolt retracting means are fixedly connected for movement together.

42. In a lock, a casing, top and bottom plates for said casing provided along opposed edges with guides forming an open bearing on one edge of said casing, a vertically movable bolt mounted for sliding movement on said bearing, and means within said casing for controlling said bolt.

43. In a lock, a casing, top and bottom plates for said casing provided along opposed edges with means forming a bearing on one edge of said casing, a bolt slidable on said bearing and covering an opening leading into the said casing, and a tumbler controlled deadlocking bolt mounted in said casing and adapted to control said first bolt through said opening.

44. In a lock, a casing, top and bottom plates for said casing provided along opposed edges with means forming a bearing on one edge of said casing, a vertically movable bolt formed for cooperation with said bearing and mounted for sliding movement thereon, a spring operable to maintain said bolt in a central position relatively to said bearing, said bolt being slidable in opposite directions on said bearing against the pressure of said spring.

45. In a locker lock, a vertically sliding locker latch bolt, means for retracting said latch bolt, a lock casing having lock mechanism for controlling said latch bolt retracting means, comprising a locking bolt carried by said lock casing and adapted for sliding movement parallel to said locker latch bolt, said locking bolt being fixedly connected for movement with said latch bolt retracting means at all times.

46. In a locker lock, a vertically sliding locker latch bolt, means for retracting said latch bolt, a lock casing having lock mechanism for controlling said latch bolt retracting means comprising a locking bolt mounted on said casing for sliding movement parallel to said locker latch bolt, means fixedly connecting said locking bolt and locker latch bolt retracting means for movement together at all times, and means whereby said bolt and said latch bolt retracting means are controlled in their movement by the locking mechanism in said lock casing.

47. In a lock, a series of rotatable tumblers having gatings, a fence adapted to enter said gatings when aligned, a deadlocking bolt movable with said fence into release position, said deadlocking bolt being spring pressed away from said fence, a locking bolt having an opening into which said deadlocking bolt may enter to deadlock said locking bolt in a predetermined locked position, said locking bolt being free to slide from said position when said fence moves into the tumbler gatings moving the deadlocking bolt into release position, means adapted to be moved by said locking bolt as it slides from said predetermined position for removing the fence from said gatings, and spring means actuated by the movement of said fence for placing said deadlocking bolt under compression and ready to spring into said locking bolt opening when said locking bolt is moved back to its predetermined locked position.

KARL A. BRAUNING.